(12) United States Patent
Chamberlain et al.

(10) Patent No.: US 7,583,560 B2
(45) Date of Patent: Sep. 1, 2009

(54) SYNCHRONIZATION OF SEISMIC DATA ACQUISITION SYSTEMS

(75) Inventors: Donald G. Chamberlain, Calgary (CA); Norman David Heidebrecht, Chestermere (CA)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 11/805,798

(22) Filed: May 24, 2007

(65) Prior Publication Data
US 2007/0253289 A1    Nov. 1, 2007

Related U.S. Application Data

(62) Division of application No. 10/653,645, filed on Sep. 1, 2003, now Pat. No. 7,269,095.

(51) Int. Cl.
*G01V 1/22* (2006.01)
(52) U.S. Cl. ............... 367/76; 367/50; 367/78
(58) Field of Classification Search ........... 367/50, 367/55, 76–80, 90
See application file for complete search history.

(56) References Cited

U.S. PATENT DOCUMENTS

| | | | |
|---|---|---|---|
| 4,086,504 A | 4/1978 | Ezell et al. | |
| 4,589,100 A | 5/1986 | Savit | |
| 4,814,711 A | 3/1989 | Olsen et al. | |
| 5,058,080 A * | 10/1991 | Siems et al. | 367/79 |
| 5,202,829 A | 4/1993 | Geier | |
| 5,276,655 A | 1/1994 | Rialan et al. | |
| 5,548,562 A | 8/1996 | Helgerud et al. | |
| 5,627,798 A | 5/1997 | Siems et al. | |
| 5,724,241 A | 3/1998 | Wood et al. | |
| 5,822,273 A | 10/1998 | Bary et al. | |
| 5,978,313 A | 11/1999 | Longaker | |
| 6,002,339 A | 12/1999 | Norris | |
| 6,002,640 A | 12/1999 | Harmon | |
| 6,078,283 A | 6/2000 | Bednar | |
| 6,079,333 A | 6/2000 | Manning | |

(Continued)

OTHER PUBLICATIONS

Bruce M. Penrod; Adaptive Temperature Compensation of GPS etc.; 1996 IEEE International Frequency Control Symposium; Aug. 1996.
Ericsson, Snap Track; Evaluation Worksheet for Assisted GPS; T1P1 (T1P1.5 LCS); Jun. 3, 1998.
Kevin Pelletier; 3-D Seismic Acquisition Techniques etc.; "Recorder", vol. XXIV, No. 4 Apr. 1999.
George A. Chidi, Jr.; Qualcomm Turns Cell Phones Into GPS Systems; IDG News Service; Jan. 16, 2002.

*Primary Examiner*—Jack W. Keith
*Assistant Examiner*—Scott A Hughes
(74) *Attorney, Agent, or Firm*—W. Allen Marcontell

(57) ABSTRACT

A network distributed seismic data acquisition system comprises seismic receivers connected to remote acquisition modules, receiver lines, line tap units, base lines, a central recording system and a seismic source event generation unit synchronized to a master clock. One or more high precision clocks is added to the network to correct for timing uncertainty associated with propagation of commands through the network. Seismic receivers and seismic sources are thereby synchronized with greater accuracy than otherwise possible. Timing errors that interfere with the processing of the seismic recordings are greatly reduced, thus enabling an improvement in subsurface geologic imaging.

7 Claims, 5 Drawing Sheets

U.S. PATENT DOCUMENTS

| | | |
|---|---|---|
| 6,172,614 B1 | 1/2001 | Robinson et al. |
| 6,188,962 B1 | 2/2001 | Morgan et al. |
| 6,253,156 B1 | 6/2001 | Bui-Tran et al. |
| 6,337,636 B1 * | 1/2002 | Page et al. ............. 340/870.13 |
| 6,400,646 B1 | 6/2002 | Shah et al. |
| 6,553,316 B2 | 4/2003 | Bary et al. |
| 6,594,284 B1 | 7/2003 | Page et al. |
| 6,801,782 B2 | 10/2004 | McCrady et al. |
| 6,975,655 B2 | 12/2005 | Fischer et al. |
| 2003/0128627 A1 | 7/2003 | Iseli et al. |
| 2006/0155758 A1 * | 7/2006 | Arnegaard et al. ...... 707/103 X |

* cited by examiner

SYNCHRONIZATION OF SEISMIC DATA ACQUISITION SYSTEMS

CROSS-REFERENCE TO RELATED APPLICATIONS

This application is a Division of pending application Ser. No. 10/653,645 filed Sept. 1, 2003. Said application Ser. No. 10/653,645 claims the benefit of U.S. Provisional Application No. 60/416,070 filed Oct. 4, 2002.

STATEMENT REGARDING FEDERALLY SPONSORED RESEARCH OR DEVELOPMENT

Not applicable

FIELD OF THE INVENTION

The present invention relates to seismic survey equipment. In particular, the invention relates to equipment assembly combinations and the synchronization of a widely distributed network of seismic receivers and seismic sources using both a wired and a wireless medium.

BACKGROUND OF THE INVENTION

In principle, a seismic survey represents an analysis of the earth's geologic structure as indicated by seismic reflections from impedance discontinuities at lithologic interfaces. The analysis is influenced by seismic wave propagation velocities respective to the successively deeper geologic formations. A precisely-timed seismic source event, such as the ignition of buried explosives in a shallow borehole or a controlled mechanically-induced continuous vibration is launched at a precisely known location and time. The seismic source unit together with its controller, the seismic event generator, are designated collectively as the seismic source.

Seismic wave reflections from this man-made seismic event are detected by a multiplicity of geophone or hydrophone sensor arrays located in a more-or-less orderly grid over the area of interest. A series of such seismic source events is initiated at varying positions over the area of interest. The positions of the seismic sensor arrays may be shifted to better receive the seismic reflections of interest prior to each successive seismic source event. The location of each seismic sensor array and each source event is precisely mapped.

As a seismic wave from the timed event travels out from the source, reflections from that original seismic wave return to the surface where they are detected by the seismic sensor arrays. The sensor arrays respond to the receipt of a wave with a corresponding analog electrical signal. These analog signals are received by data acquisition modules that digitize and record the analog signal stream for retransmission to a central recording unit. Together, the seismic sensor array and the data acquisition module to which it connects may be termed the seismic receiver. Among the significant data digitized by data acquisition modules is the amplitude or the strength of the reflected wave. The time lapse between the moment the event occurred and the moment the amplitude of the wave is received is determined by the data acquisition system and is recorded either in explicit or implicit form. For each seismic source event and each array, amplitudes are sampled over a time range typically from zero to five seconds, for an impulsive source such as the buried explosive; or zero to twenty seconds for the continuous vibratory source, for example. Samples are typically repeated every 2 milliseconds, thus generating from two to ten thousand samples per seismic source event per source array in representative cases for impulsive and vibratory sources.

In a single survey, there may be thousands of seismic source events each with thousands of seismic sensor arrays. Consequently, the data flow must be orderly and organized. For example, the data acquisition modules transmit digital sensor signal values in digital data packages containing a predetermined number of digital data bits. Each of these data packages may carry the identity of the specific seismic sensor array from which the data originates and the time it was received by the array in addition to the seismic signal amplitude value. The acquisition modules are programmed to transmit data packets respective to each seismic sensor channel at a predetermined frequency. The variable data in a data packet represents an instantaneous snapshot of the analog signal flow from the array channel. There may be numerous individual seismic sensor arrays transmitting respective analog signals to the data acquisition module on the same communication channel.

Managing an orderly flow of this massive quantity of data to a central recording unit requires a plurality of geographically-distributed digital signal processing devices. The data acquisition modules convert the array analog data to digital data and transmit the digital data packets along receiver line cables (wired) or radio transmission (wireless) channels. Cables may be of various designs including both electrical conductor and fiber optic. Wireless channels are typically conventional radio but could also include light wave transmission.

There may be numerous data acquisition modules transmitting data packets along a single receiver line or channel. Typically, two or more receiver lines connect with line tap units that further coordinate the data packet flow of numerous additional line tap units along a base transmission line for receipt by a central recording unit. The base line may have a higher speed transmission capability than the receiver line to facilitate the flow requirement.

One of the key difficulties of a widely distributed seismic data acquisition system is that the transducers which measure the seismic vibrations of the earth must be very accurately timed, relative to a system-wide master clock. Furthermore, the devices that initiate the seismic signals must likewise be very accurately timed according to the same master clock reference. Generally acceptable timing accuracy is on the order of 50-100 microseconds, although accuracy as low as 1 millisecond can be tolerated in some circumstances. Less accurate timing can result in signal degradation in the various stages of processing to which the measured seismic reflections are subsequently subjected. The ultimate goal, to image the subsurface geologic layers, may be severely compromised by errors in timing accuracy of the recorded data.

A seismic data acquisition system may have many thousands of arrays of transducers (termed seismic sensor arrays) in contact with the earth with all of them being simultaneously measured and recorded. Many thousands of such recordings, each with a different seismic source location, are made during the course of a single 3D seismic survey. All of the recorded data may be combined in the imaging process. Difficulties in guaranteeing accurate timing arise due to the wide geographic dispersal of the seismic sensor arrays, often over varying and difficult terrain. The seismic sources are also positioned widely and initiated once for each recording, thus many thousands of times during the course of a typical survey project. The distances and obstacles separating the seismic receivers and sources make the synchronization of these seismic survey system elements very challenging.

It would thus be desirable to have a synchronization method and suitable equipment and software that could be used under a very wide range of conditions, including both wired and wirelessly connected network elements, to provide highly accurate and reliable synchronization of both seismic receivers and seismic sources in a networked total system. Such a system has been invented and is described in the remainder of this document.

BRIEF SUMMARY OF THE INVENTION

It is therefore an object of the invention to provide methods and apparatus for improved synchronization of seismic data acquisition through utilization of a master clock, one or more high-precision clocks distributed in a wired or wireless network of seismic data acquisition devices and seismic source devices, and other less precise clocks located elsewhere in the network, wherein the methods of utilization are varied and summarized as described herein.

It is a further object of the invention to utilize time signals from a global positioning system (GPS) or a radio beacon system to replace or supplement the role of the master clock and/or high precision clocks in the network of data acquisition devices and seismic source devices, thereby providing improved synchronization.

It is another object of the invention to provide an improved method of synchronizing clocks to the master clock, to a high precision clock or to an adjacent clock of less precision by utilizing known transmission delay distributions for the portion of the network between the reference clock and the clock to be synchronized. According to this aspect of the invention the transmission delay characteristics for the germane transmission path may be measured or derived a priori and stored with the device that controls the clock to be synchronized. Then delay patterns of repeated synchronization signals are statistically characterized and may be compared to the stored characterization patterns. An improved synchronization is thereby facilitated.

The methods of the invention may be applied whether the network elements are in communication through wired or wireless means such as but not limited to radio, conductive cable, fiber optic cable, seismic signaling and other means.

According to one aspect of the invention, seismic source events may be triggered at scheduled times or at random times but at times synchronized with greater accuracy using one or more methods and/or the apparatus of the invention.

A further aspect of the invention provides a method of synchronizing high precision clocks to the master clock by bringing them in close proximity and connecting them either physically or through short wireless transmission paths in order to synchronize, then placing them in their remote locations within the seismic network.

The invention includes a method of time-stamping data by a higher-precision clock before transmission of data to a device containing another clock further distributed in the network there by facilitating improvement in synchronization by shared reliance on the accuracy of the high-precision clock.

According to one aspect of the invention, the seismic network may include a high-speed backbone connecting lower speed branches to a central point wherein the backbone has less transmission delay and a tighter statistical distribution of transmission times enabling better synchronization of the clocks connected to the backbone.

All aspects of the invention may contribute to the better synchronization of seismic sources and/or the recording of seismic data by the receivers, enabling improved seismic imaging of the earth's subsurface.

Additional objects and advantages of the invention will become apparent to those skilled in the art upon reference to the detailed description taken in conjunction with the provided figures.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designated like or similar elements throughout.

DETAILED DESCRIPTION OF THE INVENTION

Figure 1:
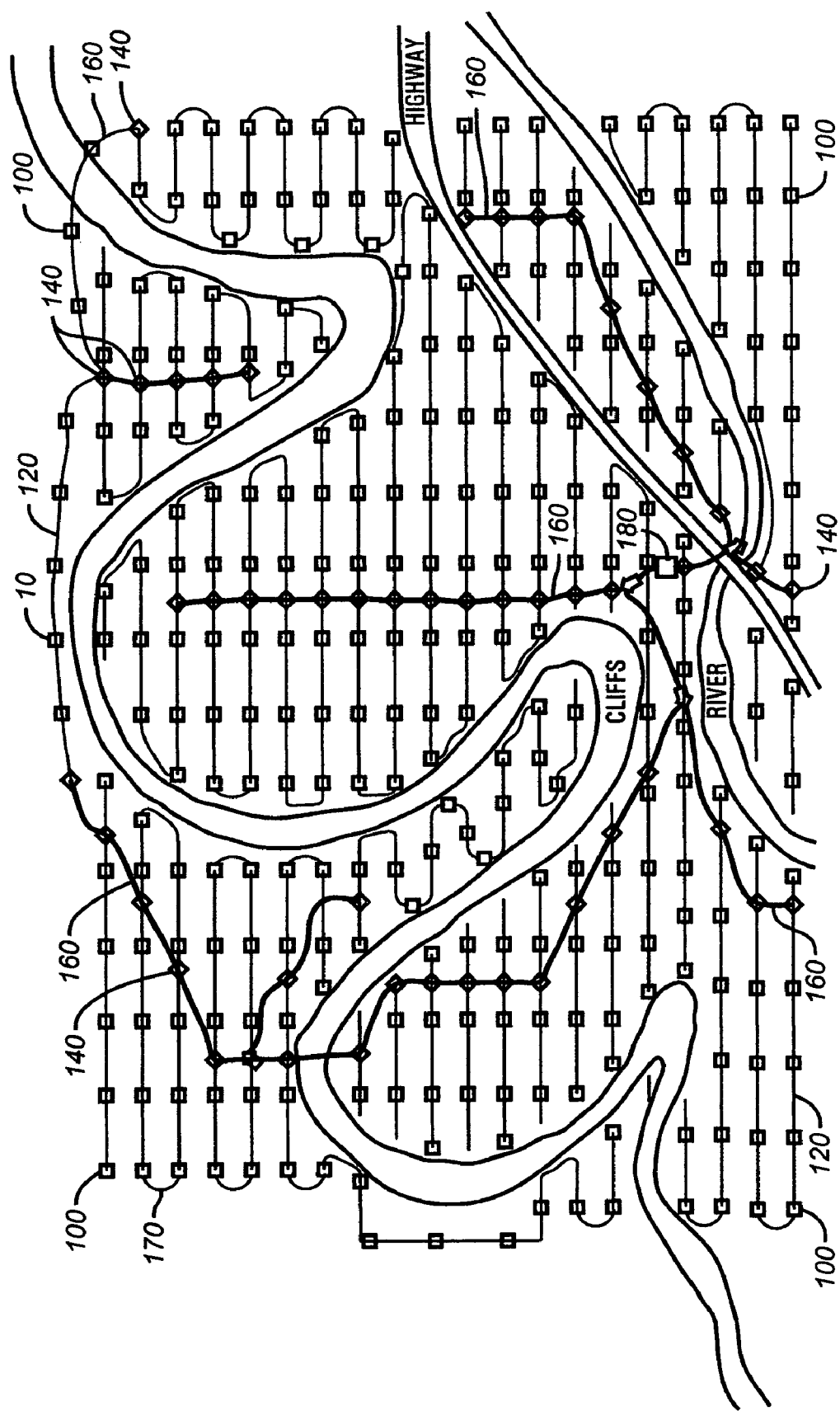
FIG. 1 is a schematic representation of a typical seismic survey field layout.

For reference, a typical seismic survey grid is shown schematically by FIG. 1 to include a large number of remote acquisition modules (RAMs) 100 having orderly connections along receiver lines 120 to respective line tap units 140. Line tap units (LTUS) 140 connect receiver lines 120 to base lines 160. The base lines 160 connect ultimately to the central recording unit (CRU) 180. Jumpers 170 connect ends of receiver lines 120 to form loops. RAMs 100 perform functions of collecting seismic sensor array signals, digitizing these signals if they are not already digitized within the arrays, and transmitting the data toward the CRU 180. Also the RAMs 100 receive communications originated by the CRU 180 and by more remote RAMs 100 and relaying this information to adjacent RAMs 100 or LTUs 140.

Seismic sensors are connected to the RAMs 100 and may be of one or more types of transducers such as geophones or hydrophones. Sensor arrays may range from single sensors to multiple sensors in geometrical arrays, combined to form one or more signal channels per RAM.

Specialized seismic sources create the seismic waves that travel into the subsurface and reflect upward to the surface where they are detected by the seismic sensor arrays connected to the RAMs 100. The various RAMs, receiver lines, LTUs, base lines, jumpers and CRU perform as a seismic communications network, and also as a seismic data acquisition system, according to the commands emanating from the CRU 180.

Receiver line segments and base line segments may be physically realized by employment of sections of cable. The cable may contain electrical conductors or optical fibers (of a combination thereof) to carry signals in both directions, logically toward or away from the CRU 180.

Alternatively radio or light wave communications may replace the conventional cable sections connecting the various modules shown in FIG. 1 so that cables are not required for communication yet are still required for connecting seismic sensor arrays to the RAMs 100.

Figure 2:
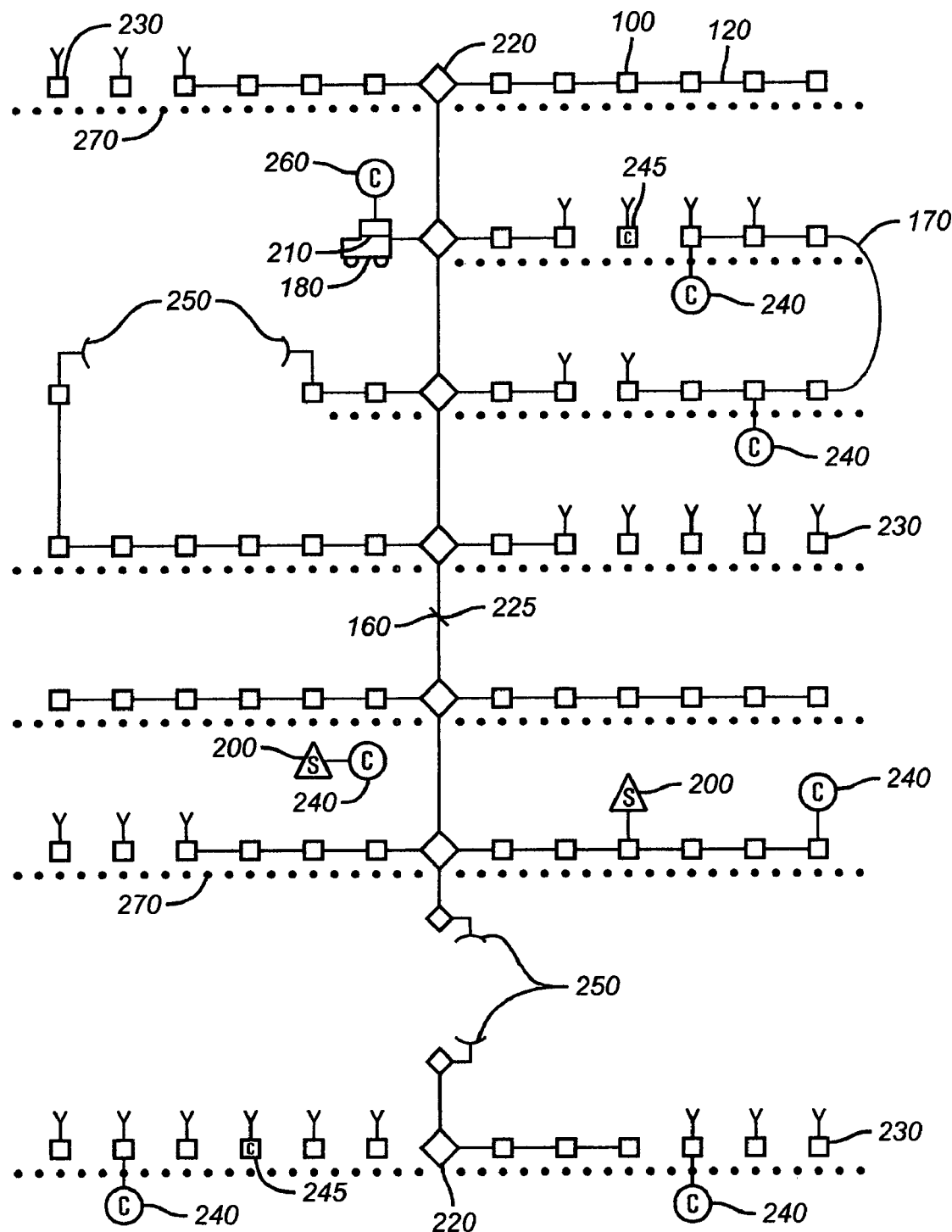
FIG. 2 is a schematic representation of a seismic survey field layout combining wired and wireless connections between various network elements and incorporating features of the preferred embodiment.

FIG. 2 provides a map view schematic diagram of a seismic data acquisition network system so configured and with additional capabilities according to the preferred embodiment of the present invention, with wireless RAMs 230 situated wherever it is more convenient to bypass obstacles using wireless connections. Point-to-point wireless links 250 may likewise be utilized to bypass obstacles along the base line. A combination of wired and wireless network elements makes up the hybrid total network. Wireless network elements may also retain the capability to communicate via conventional cable circuits to add flexibility to network implementation.

Source event generators 200 are actuated under control of the CRU's 180 control electronics 210 according to the dictates of the human operator. The various cable sections and modules, as well as the control electronics 210, a component of the CRU 180, may be frequently repositioned during the course of the seismic survey. The area of the survey may be water-covered, even to depths in excess of 100 m, partially submerged or wholly dry land. Therefore the operator wishes to have reliable and robust equipment that can be readily reconfigured for each new physical location and position within the network, and be readily and reliably synchronized under these diverse conditions.

Commands and data emanating from a central point in the network, more specifically the control electronics 210 in the CRU 180 (FIG. 2), travel from the originating point along the provided wired or wireless transmission pathways to the adjacent network modules. These network modules may be LTUs (140), high speed LTUs (220), point-to-point wireless links (250) or RAMs (100 if not capable of wireless data transmission, or 230, if capable of wireless) in proximity to the CRU 180. The commands and data are relayed from there to the next adjacent network module. This process continues from modules nearer to the CRU 180 to adjacent modules which are one step further from the CRU 180, and so on, until the furthermost modules in the network receive the commands and data. ("adjacent" or "in proximity" here means "logical proximity" in a network definition sense. Physical position may not conform exactly to the descriptors "adjacent" or "in proximity" in a network sense.)

The networked LTUs and RAMs are designed to receive commands and data from a neighboring RAM or LTU on one physical side, and retransmit the command or data to a neighboring RAM on its other physical side. In this fashion commands and data can reach all RAMs in the network. The length of time it takes commands or data to travel from the CRU 180 to any particular RAM in the network is not entirely predictable. Every time one RAM repeats another modules commands or data, a small but significant timing uncertainty is added to the propagation time of the command or data. This timing uncertainty limits the degree to which RAMs (and LTUs) can be synchronized. In prior art systems this in turn results in sensor arrays being measured at the wrong instants in time.

Data acquisition modules and inter-connecting networks of many designs and types are available in the industry, but they all suffer from problems of unreliable synchronization or poor synchronization accuracy under some conditions. The unique features of the present invention, described in the remainder of this section, overcome these limitations.

The network shown in F*ig*.2 embodies other innovations relative to the network in FIG.1. that are of paramount importance in the present invention. These innovations include the distributed high precision clock modules 240, source event generators 200, wireless capability, GPS capability and also the high-speed backbone 225 and high speed LTUs 220. For example, this high-speed backbone may be a fiber-optic linkage. It is designed to have greater bandwidth and smaller communication delays than that of the receiver lines 120 and their LTUs 140. Nevertheless, a small delay will be characteristic of each element of the high speed backbone.

To facilitate solution of the synchronization problem, a network master clock 260 and one or more additional high precision clock modules 240 are added to the network of RAMs. The master clock 260 is typically based on a high precision oscillator circuit such as an OCXO (Oven Controlled Crystal Oscillator) device capable of a very high precision such as 0.001 PPM. The master clock 260 also contains a GPS module 340 as do the high precision clock modules 240. The master clock 260 may be of identical design to the high precision clock modules 240 or it may contain features that provide even higher precision. It may also be equipped to receive local, regional or global radio signals containing highly precise time signals. Utilizing time-stamping of information transmitted outwards in the network from the CRU 180, the high precision clock modules 240 correct for the timing uncertainty associated with the propagation of commands and data throughout the network. The high precision clock modules 240 can take various forms and can be located internally or externally to the RAMs and LTUs. In FIG. 2 an internal high precision clock module 245 is shown internal to a wireless RAM 230, in the lower left part of the diagram.

Figure 3:
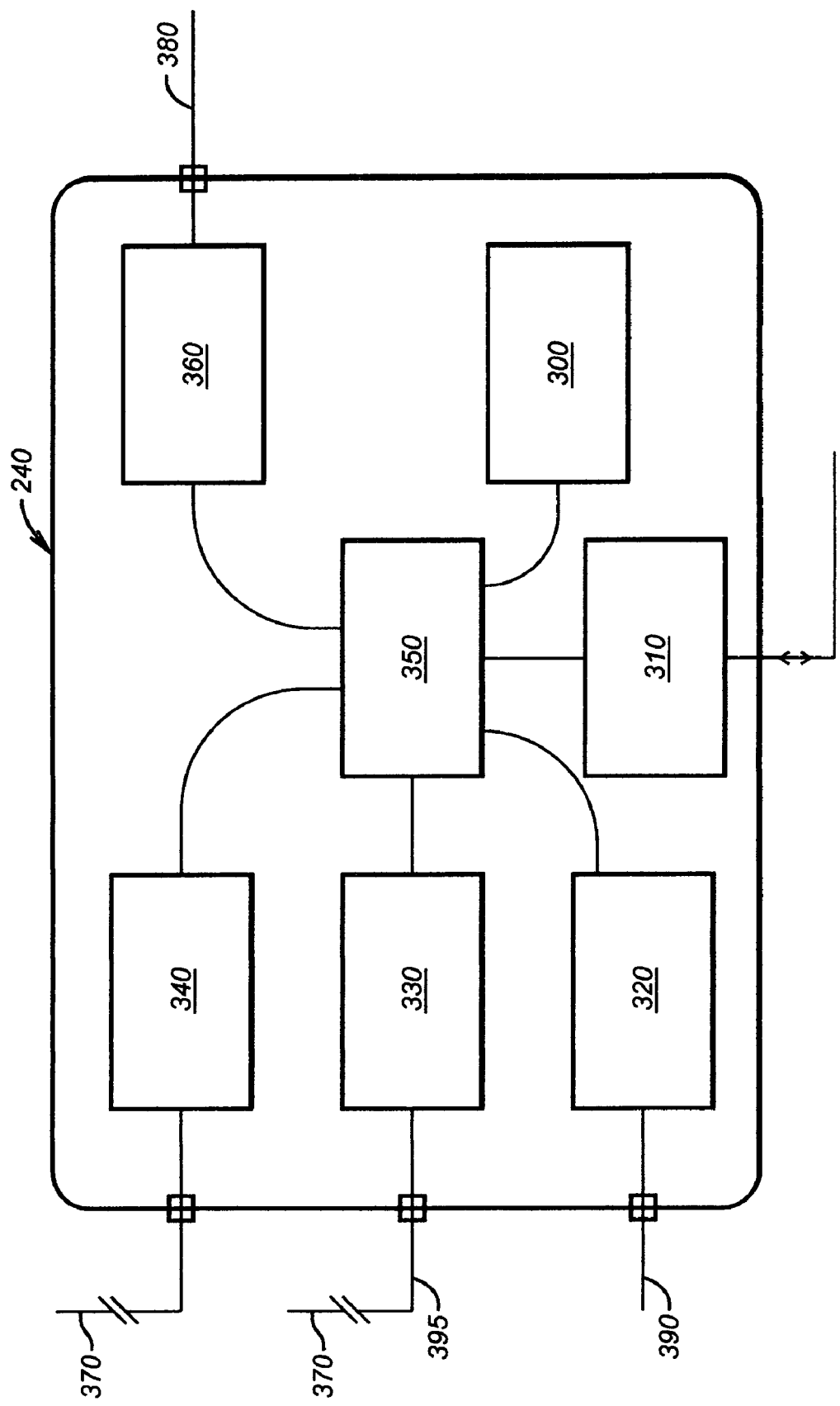
FIG. 3 is a schematic drawing of a high precision clock module according to the present invention.

FIG. 3 is a schematic drawing of the high precision clock module 240. In one application, the high precision clock module 240 relies solely on the high precision clock 300 for its time keeping (after synchronization to the master clock 260). If the GPS module 340 is utilized, however, both the high precision clock and the GPS module 340 are utilized together in time keeping. In another mode, the radio beacon signals instead of GPS time signals are utilized together with the high precision clock. The high precision clock 300 is typically based on a high precision oscillator capable of time keeping with errors 0.001 PPM. In another embodiment, the high precision clock possesses an oscillator of lower precision, such as 0.5 PPM, but in this case the high precision clock module 240 relies on the GPS module or radio beacon signals to attain high precision. In this embodiment the highly precise GPS time signals or radio beacon signals are used to continually correct the drift of the less precise clock, and in this way the high precision clock module 240 does achieve high precision.

The high precision clock module 240 includes a RAM interface 310 enabling it to be connected to a wireless RAM 230. A wired clock interface and synchronization module 320 connected to a high precision clock wired linkage 390 provides a means for physical connection to another high precision clock module for purposes of synchronization. A wireless clock interface and synchronization module 330, utilizing radio beacon signals received through high precision clock wireless linkage 395, provides a parallel capability for synchronization without physical connection to another module. In another mode, GPS antenna 370 connects to GPS module 340 providing a means of receiving and processing GPS signals useful for positioning as well as precise synchronization. Seismic event controller 360 and event controller linkage 380 provide a means to communicate with source event generators 200. This linkage may be wired or wireless. Controlling the other modules and responsible for the primary time-keeping, synchronization and communication functions of the high precision clock module 240 is the DSP controller and timer 350.

Figure 4:
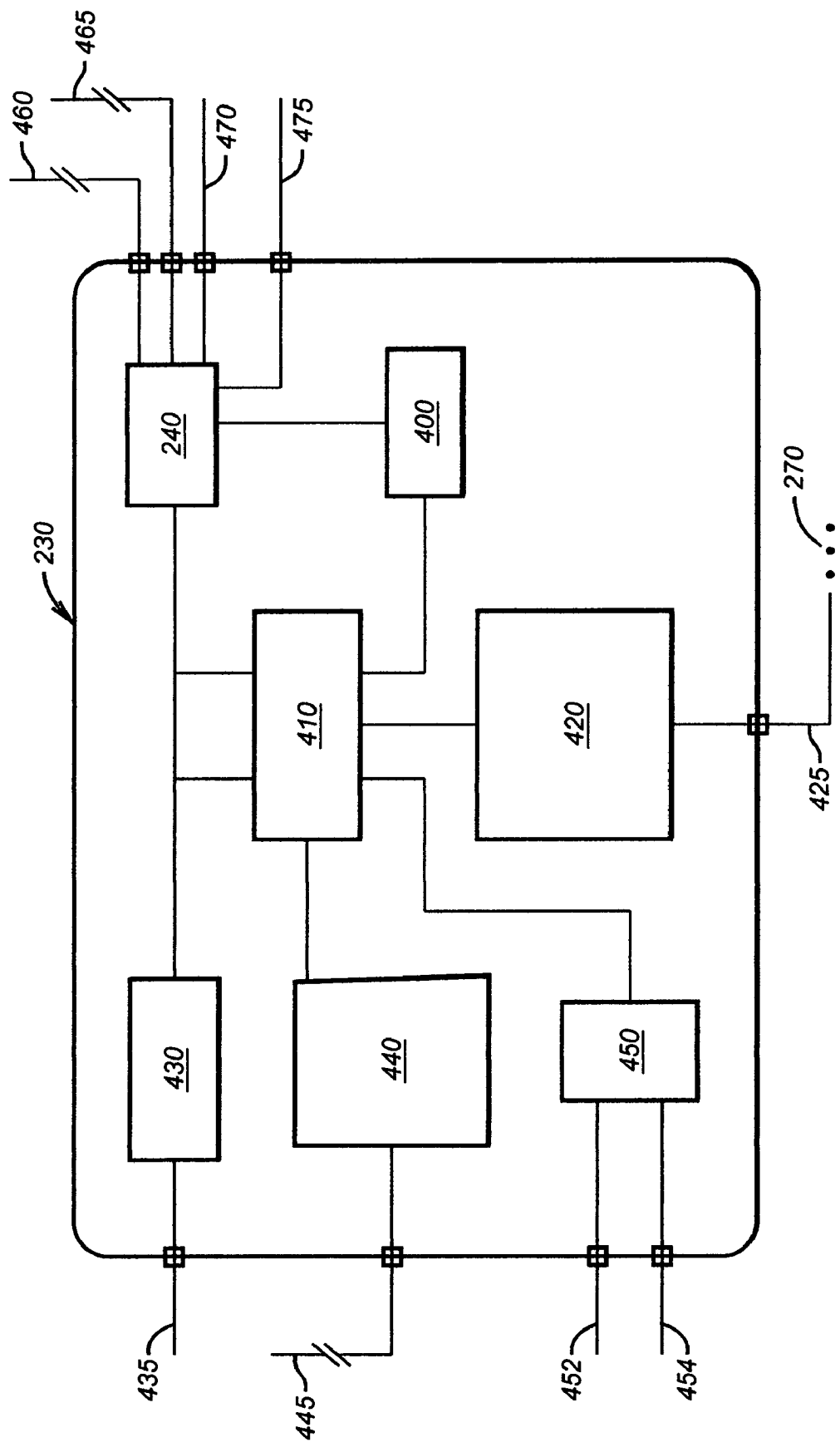
FIG. 4 is a schematic drawing of a wireless data acquisition module (RAM) according to the present invention.

FIG. 4 is a schematic drawing of a wireless data acquisition module (RAM 230) according to the preferred embodiment. The analog, analog-to-digital circuitry and test circuitry 420 provides the functionality for converting the analog signals from one or more seismic sensor arrays 425 containing the seismic sensors 270 comprising geophones and/or hydrophone transducers. This circuitry 420 is connected to the DSP controller 410 that also interfaces to the other principle components of the RAM 230 and controls their functions. An internal clock 400 contains a TCXO (Temperature Compensated Crystal Oscillator) or equivalent oscillator circuit with time-keeping precision on the order of 0.5 PPM. The RAM 230 optionally includes an internal high precision clock module 245. In the preferred embodiment this module 245 contains a GPS module 340 and an oscillator circuit that may be based on a TCXO oscillator with precision such as 0.5 PPM, less precise than an oscillator that might be used in an external high precision clock module 240, and also requiring less power, a critical design factor for the RAM 230. GPS antenna 460 provides a means of receiving GPS signals which are processed by the GPS module 340 within the internal high precision clock module 245. Clock antenna 465 provides for reception of radio signals from a project local, regional or global beacon containing precise timing information. These signals are also processed within the internal high precision clock module 245. Two further external linkages to the internal high precision clock module 245 are the wired high precision clock linkage—for use if the RAM 230 is to be connected with an external high precision clock module—and a linkage 475 that connects to a source event generator 200.

A mobile clock module interface 430 and linkage to a mobile clock 435 provide a facility for rapid temporary connection of the RAM 230 to a high precision clock module 240 for purposes of synchronizing the RAM internal clock 400 and/or the optional internal high precision clock module 245.

In FIG. 4 a wireless transceiver radio 440 is controlled by the DSP controller 410 for purposes of network communication. Antenna 445 connects to the wireless transceiver radio 440. Communication module 450 is also connected to DSP controller 410 and provides a second means of communicating: by conventional wired network linkage. Communication linkage 452 connects to the previous network device (nearer to CRU 180 in a network sense) and communication linkage 454 connects to the next network device along the cable (further from the CRU 180).

The process of synchronizing the entire network, including all LTUs and RAMs, to the Master Clock 260 is undertaken just prior to the beginning of a period of seismic data acquisition and frequently thereafter, as is necessary to maintain a desired accuracy of synchronization. Synchronization of the network is done in two stages, first synchronization of the high precision clocks throughout the network, and subsequently, synchronization of the remainder of the clocks. Each LTU (140 or 220) and RAM 230 that does not possess a high precision clock module (240 or 245) will have its clock synchronized in the second stage. After the second stage of synchronization, the accuracy of sample times of the seismic sensor array data by the RAMs will be within the desired limits of accuracy.

Clock drift is a continuous process, so it is necessary to periodically synchronize. Synchronization may done on a frequent and regular planned schedule, known to all the RAMs 230 and LTUs (140 or 220). Synchronization signals may originate from the device having access to the Master Clock 260, normally the CRU 180. Synchronizing may include both of the two stages, i.e. first the high precision clocks, secondly the remainder of the clocks, or synchronization may include only the stage two of the process (if only Stage 2 is performed, it is necessary to have performed a Stage 1 synchronization at some previous time). In this simplified resynchronization (stage two only) the high precision clocks are relied upon as standards for regions of the network in their proximity. A more efficient resynchronization is made possible due to reliance on the distributed high precision clocks.

Three different mechanisms to synchronize or calibrate the high precision clocks, as required in the first stage of network synchronization, are described next. These methods are 1) Synchronizing Clocks before deployment, 2) Synchronizing Clocks after deployment though Direct Transmission, and 3) Synchronizing Clocks after deployment though Repeated Transmission.

(1) Synchronizing High Precision Clocks Before Deployment:

Before the high precision clock modules, 240 and 245, are deployed throughout the network, they are brought to a central location and synchronized. The high precision clocks, whether external or internal to the RAMs 230 are each directly connected through wires or a short distance wireless medium (such as optics) to a (single) master clock 260 and calibrated or synchronized. Once calibrated or synchronized, the clock can be used to provide very accurate timing information to any device connected to the clock either through a wired or wireless medium. The purpose of connecting the clock to the master clock through only wires or a short distance wireless medium is to prevent or minimize any addition of timing uncertainty that an intermediary device might add in calibrating or synchronizing the master high precision clock with another high precision clock. Once synchronized, the high precision clocks are deployed and connected to devices in the network.

(2) Synchronizing Clocks After Deployment Through Direct Transmission:

Unsynchronized high precision clock modules 240 are first connected to specific RAMs 230 in the network and a timing signal is transmitted to them and to the internal high precision clock modules 245 which serves to synchronize all of them to the master clock 260.

The wireless medium synchronization can be done in three different ways:

a) The high precision clock modules 240 and 245 and master clock 260 can be designed to receive the very accurate timing information transmitted from the Global Positioning System (GPS), a series of satellites, which orbit the earth. The GPS timing information can be used to continually keep the master clock 260 and the high precision clock modules (240 and 245) synchronized. Other satellite networks may provide equivalent timing information and may be utilized instead of the GPS.

b) The high precision clock modules 240 and 245 can be designed to receive a radio signal transmitted from a centrally located master clock 260 which is brought on site. The radio signal transmitted from the master clock is designed to reach all the high precision clock modules. The radio signal is used to synchronize all the high precision clocks to the master clock.

c) The master clock 260 and the high precision clock modules 240 and 245 can be designed to receive a radio signal transmitted regionally or worldwide that provides a sufficiently accurate timing reference.

(3) Synchronizing Clocks After deployment Through Repeated Synchronization Transmissions:

In most cases, the propagation uncertainty resulting from the rebroadcast of synchronization signals, commands, and data has a known statistical distribution, or a distribution that can be determined in advance, which can be exploited to improve the synchronization of the RAMs 230 in the network. To begin with, both a definite upper and a lower limit can be set on the propagation time of the signals. The uncertainty of the propagation time can be either:

a) Uniformly Random: any delay is equally likely as long as it is greater than [then] a minimum propagation time and less than [then] a maximum propagation time. If both RAMs 230 know the predetermined times and intervals, then as the first RAM transmits synchronization signals, the second RAM is able use its internal clock to find a moment where 50% of the synchronization signals come before that moment and 50% of the synchronization signals come after that moment. That moment will be the predetermined transmission time plus the midway interval between the minimum and maximum propagation times.

b) Weighted: any delay between a minimum and a maximum value is possible with certain delays more likely than others.

Any delay must be greater than a minimum propagation time and less then a maximum propagation time. The statistical distribution of the propagation times is calculated in a controlled environment meant to match the environment in which the RAMs 230 are to be used. The statistical distribution is programmed into all the RAMs to be used at a later date. The statistical distribution is dependent on the physical environment, the properties of the electronics in RAMs, and the firmware controlling the functioning of the RAMs. When the RAMs attempt to synchronize themselves in actual use, the first RAM transmits a synchronization signal to a second RAM which will use the synchronization signal and prior knowledge of the propagation statistical distribution to synchronize its clock to the first RAM. The first RAM will send synchronization signals to the second RAM at the same frequency and interval as was done in the controlled environment in which the propagation statistical distribution was determined. Using its internal clock, the second RAM will measure the interval between when it expected to receive the synchronization signal and when it actually received the synchronization signal. This interval is known as the reception interval. The second RAM will match that pattern of reception intervals with the pattern of reception intervals stored inside the second RAM. The more synchronization signals the second RAM receives from the first RAM, the more accurately the second RAM can match the reception interval pattern to the known reception interval pattern. The goal is to receive enough reception intervals to match a specific reception interval with the previously determined reception interval pattern. Once a match to the pattern is found, the second RAM, knowing the transmission time delay from the first RAM to the second RAM, will be able to determine the drift of its internal clock 400. The second RAM can reset its internal clock to be synchronized with the first RAM's clock by accounting for the known time delay of the propagation signal.

Each RAM 230 in the network can also use this method (in the stage two of the synchronization process) starting from a synchronized high precision clock module 240 or 245 which synchronizes the adjacent RAMs, which in turn synchronize their adjacent RAMs, until all the RAMs in the network are synchronized.

Synchronizing RAMs Without a High Precision Clock Module to the RAMs With a High Precision Clock:

The control electronics 210 of the CRU 180 transmit synchronization signals on to the network to which all RAMs 230 synchronize. Each RAM receives the synchronization signal from a neighboring RAM 230 or LTU (140 or 220) on one physical side of the device and rebroadcasts the synchronization signal to another neighboring RAM or LTU on its other physical side. In this way, the synchronizing signal travels to all the devices connected to the network. The act of re-broadcasting the synchronization signal adds a small, but significant uncertainty to the propagation time of the synchronization signal as it travels throughout the network. Included in the synchronization signal is a timestamp. The timestamp contains the best estimate of the time of initiation of the original synchronization signal according to the master clock 260. The timestamp is used to set each RAM's internal clock 400 to the same moment after adjusting for expected propagation time. Because of the uncertainty added in the propagation time of the synchronization signal, the propagation time can't be perfectly accounted for when adjusting the RAMs internal clock 400. As the synchronization signal travels throughout the network, it encounters RAMs with a high precision clock module (240 or 245) which have been synchronized with the master clock 260. Each RAM 230 with a high precision clock module replaces the timestamp that it receives from the neighboring RAM with a more accurate timestamp that it generates, such that the more accurate timestamp is a better estimate of the true time that the synchronization signal originated at the master clock 260. It then sends the synchronization signal with the new timestamp to its neighbor just as it would have if it didn't have a high precision clock. In this manner, the degree of uncertainty of the synchronization can be reduced to the uncertainty of the high precision clock plus the uncertainty that each RAM without a high precision clock adds to the synchronization time. For instance, if a RAM is 5 re-broadcasts away from a high precision clock, then only the added uncertainty of retransmitting the synchronization signal 5 times plus the uncertainty of the high precision clock effects the synchronization of that RAM.

Figure 5:
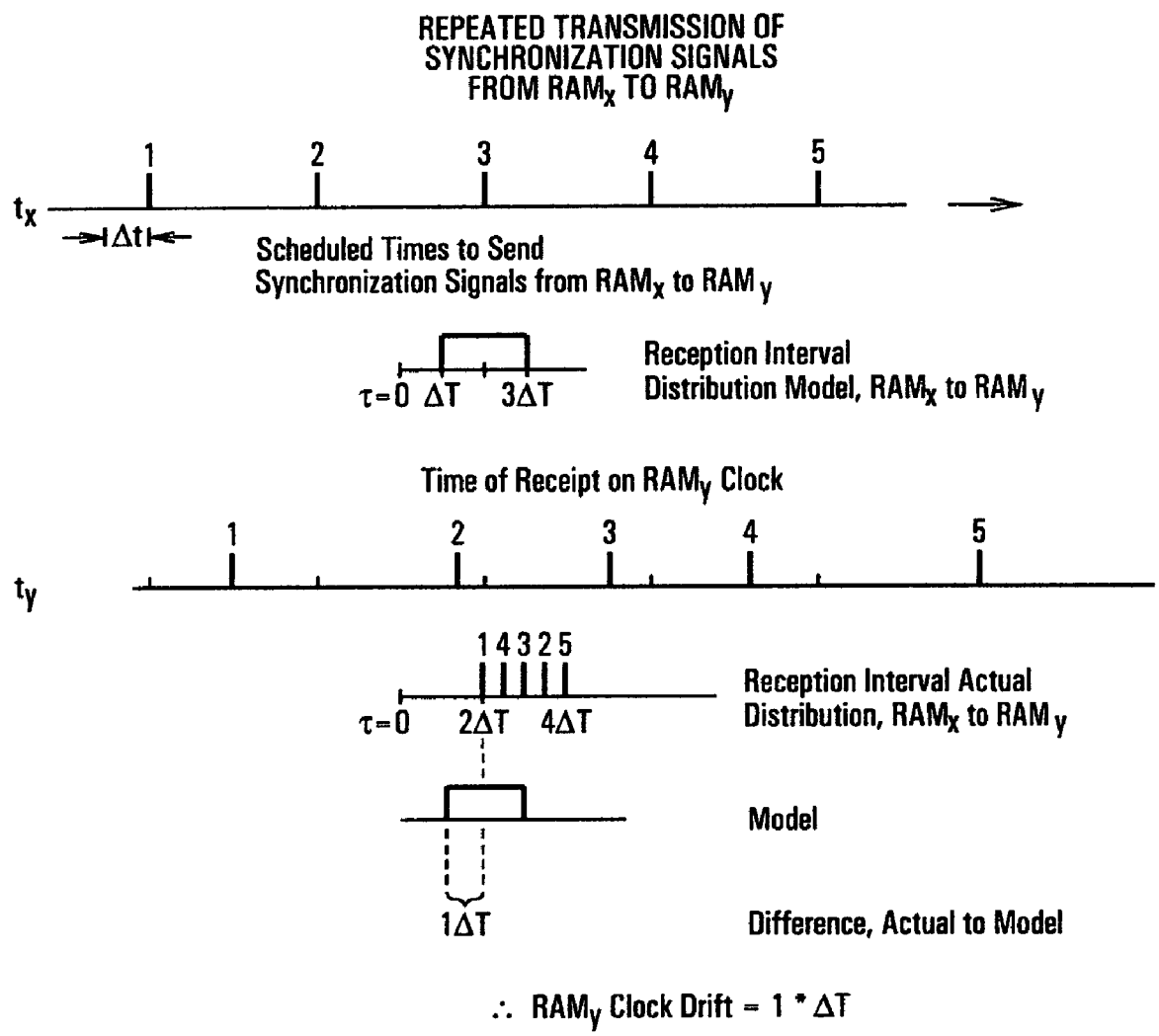
FIG. 5 is a time line representation of the repeated transmission of synchronization signals showing statistical spreading of reception intervals and determination of clock drift.

FIG. 5 illustrates the method of synchronizing using repeated transmissions. For illustration only five scheduled transmissions are used. RAM-X transmits synchronization signals to RAM-Y over the communication channel. The communication channel may be wired or wireless and may have intervening network devices which receive and re-transmit the synchronization signals. In any case, RAM-Y possesses a Reception Interval Distribution Model which provides it with the expected behavior of the communication linkage in terms of probabilistic distribution of reception intervals. In this example the model is a uniform distribution from DeltaT to 3 DeltaT, where DeltaT is 0.5 times the interval between scheduled synchronization signals. The actual times of receipt, according to RAM-Y's clock are shown next. The five signals are spread uniformly from 2 DeltaT to 4 DeltaT. This is in perfect conformance with the model, except there is a shift of 1 DeltaT to the right. RAM-Y therefore computes that its internal clock lags RAM-X's clock by 1 DeltaT. RAM-Y completes the synchronization to RAM-X's clock by setting its own internal clock back by 1 DeltaT. This example is simplified by showing a perfect match of the actual reception intervals to the model. If the match is not perfect in practice, RAM-Y will perform a best-fit computation to optimize the synchronization as best it can.

Seismic Event Generation and Synchronization:

With seismic recording, a seismic event is needed to induce a seismic signal into the earth, which then reflects, refracts, and diffracts from the subsurface layers of the earth and eventually is picked up by the transducers planted in the earth. The seismic event for instance could be a dynamite explosion, or a mechanical device, which induces a signal into the earth. The seismic event generator 200 needs to be synchronized with the deployed RAMs 230 which measure the seismic signals created by the seismic event. The synchronization of the RAMs with the seismic event generator can be done with the use of the high precision clock modules 240. A seismic event generator 200 may simply connect to a RAM 230 which has the ability to trigger the seismic event generator to produce a seismic event. Also, the seismic event generator may have either an internal or external high precision clock module (245 or 240) whose function it is to trigger the seismic event generator at predetermined moments in time when all the RAMs are synchronized and are measuring the seismic signals picked up by the seismic sensors 270. The synchronization of the internal or external clock module which is connected to the seismic event generator is to be done in one of the three methods described, namely: 1) Synchronizing Clocks before deployment, 2) Synchronizing Clocks after deployment though Direct Transmission, and 3) Synchronizing Clocks after deployment though Repeated Transmission.

Recording of Seismic Signals:

Once all the RAMs 230 are synchronized, they are programmed to start measuring the seismic sensors 270 at a specific time of day or to start measuring them after a programmed delay. The synchronized RAMs can use an internal clock 400 to continue to measure the transducers at the appropriate moments. Each RAMs internal clock may need to be periodically re-synchronized with the rest of the RAMs in the network using one of the three methods described, namely: 1) Synchronizing Clocks before deployment, 2) Synchronizing Clocks after deployment though Direct Transmission, and 3) Synchronizing Clocks after deployment though Repeated Transmission. The times that the RAMs need to be re-synchronized will be dependent on drift of the oscillators relative to each other and the needed seismic sensor array measurement precision.

The recorded data may be stored in memory at the originating RAM.230 It may also be transmitted via intervening network elements or directly to the CRU 180. Before reaching the CRU it may be temporarily stored in another RAM or LTU (140 or 220). Because data packets are either explicitly or implicitly time-stamped by the originating RAM with the best estimate of the master clock time at which the samples were taken, no further synchronization errors can occur during this transmission and data compilation phase of the seismic data acquisition process.

Although our invention has been described in terms of specified embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

What is claimed is:

1. A method of operating a seismic survey network having first and second seismic data acquisition modules (RAMs) connected along a data signal transmission route to a central processing unit (CRU), said first and second RAMs having respective module clocks and said CRU having a network master clock, said data transmission route comprising a first signal carrier increment between said first and second RAMs and a second signal carrier increment between said second RAM and said CRU, said method comprising:

A step for determining a first statistical distribution of propagation uncertainty for the transmission delay time for a signal transmitted along said first signal carrier increment from said second RAM to said first RAM:

A step for determining from said first statistical distribution a first probable signal transmission delay time along said first signal carrier increment;

A step for determining a second statistical distribution of propagation uncertainty for the transmission delay time for a signal transmitted along said second signal carrier increment from said CRU to said second RAM:

A step for determining from said second statistical distribution a second probable signal transmission delay time along said second signal carrier increment;

A step for transmitting at predetermined times along said second increment to said second RAM a digital clock synchronization signal from said CRU that includes a timestamp value of said network master clock time at the moment of transmission;

A step for retransmitting along said first increment said synchronization signal from said second RAM to said first RAM;

A step for recording a first indicated time value of said first RAM clock upon receipt of said synchronization signal by said first RAM;

A step for determining a first expected receipt time of said synchronization signal by said first RAM based upon the timestamp value of said synchronization signal and the sum of said probable signal transmission delay times along said first and second signal carrier increments;

A step for determining the value of a first reception interval between said first expected receipt time and said first indicated receipt time of said synchronization signal by said first RAM; and, A step for correcting the presently indicated time value of said first RAM clock by the value of said first reception interval to best correspond with the present value of said network master clock.

2. A method as described by claim 1 comprising:

A step for recording a second indicated time value upon receipt of said synchronization signal by said second RAM;

A step for determining a second expected receipt time of said synchronization signal by said second RAM based upon the timestamp value of said synchronization signal and said probable signal transmission delay time along said second signal carrier increment;

A step for determining the value of a second reception interval between said second expected reception time and said second indicated receipt time of said synchronization signal by said second RAM; and, A step for correcting the presently indicated time value of said second RAM clock by the value of said second reception interval to best correspond with the present value of said network master clock.

3. A method as described by claim 1 wherein said first probable signal transmission delay time is the midway interval between minimum and maximum signal propagation delay times.

4. A method as described by claim 1 wherein said first RAM clock has greater time keeping precision than said second RAM clock, said method comprising:
- A step for replacing the timestamp value of said synchronization signal from said CRU with a value corresponding to the presently indicated time value of said first RAM clock; and,
- A step for transmitting a synchronization signal with said timestamp value replacement by said first RAM to another RAM having a clock of less precision than said first RAM clock along another signal carrier increment.

5. A method as described by claim 1 comprising a step for deriving said network master clock time from global positioning satellite signals.

6. A method as described by claim 1 comprising a step for deriving said first clock time from global positioning satellite signals.

7. A method as described by claim 1 comprising a step for deriving said first clock time from radio beacon signals.

* * * * *